US005617217A

United States Patent [19]
Brewer et al.

[11] Patent Number: 5,617,217
[45] Date of Patent: Apr. 1, 1997

[54] ENGRAVING METHOD AND APPARATUS FOR GENERATING ENGRAVING DRIVE SIGNALS FOR ENGRAVING ENGRAVED AREAS OF ACCURATELY CONTROLLED SIZE IN THE SURFACE OF A WORKPIECE USING COEFFICIENT VALUES AND ASSOCIATED SET UP PARAMETER VALUES

[75] Inventors: Matthew C. Brewer, Dayton; Eric J. Serenius, Springboro; David M. Reese, Dayton, all of Ohio

[73] Assignee: Ohio Electronic Engravers, Inc., Dayton, Ohio

[21] Appl. No.: 394,722

[22] Filed: Feb. 27, 1995

Related U.S. Application Data

[63] Continuation-in-part of Ser. No. 22,127, Feb. 25, 1993, Pat. No. 5,424,845, Ser. No. 38,679, Mar. 26, 1993, Pat. No. 5,438,422, and Ser. No. 125,938, Sep. 23, 1993, Pat. No. 5,440,398, which is a continuation-in-part of Ser. No. 38,679.

[51] Int. Cl.$^6$ ....................................................... B41C 1/04
[52] U.S. Cl. ................................................................. 358/299
[58] Field of Search .......................... 358/299; 364/474.02, 364/474.35, 474.37

[56] References Cited

U.S. PATENT DOCUMENTS

| | | | |
|---|---|---|---|
| 2,493,628 | 1/1950 | Harley | 88/14 |
| 2,777,058 | 1/1957 | Boyajean | 250/27 |
| 2,874,479 | 2/1959 | Farber | 33/185 |
| 2,943,564 | 7/1960 | Demer | 101/93 |
| 3,612,753 | 10/1971 | Korman | 178/5.2 A |
| 3,652,992 | 3/1972 | Koll | 340/146.3 B |
| 3,769,455 | 10/1973 | De Vos et al. | 178/6.6 B |

(List continued on next page.)

FOREIGN PATENT DOCUMENTS

| | | | |
|---|---|---|---|
| 0595324 | 5/1994 | European Pat. Off. | B41C 1/045 |

OTHER PUBLICATIONS

The Gravure Association of America, *The Gravure Engraving Manual* (1987).
Balcom, *Basic Rotogravure* (1988).
Heimann GmbH, *Drucktechnische Beratung–Graphischer Handel* (Pamphlet, Hamm, Germany, 1984).
Heimann GmbH, *Check–Master* (Pamphlet, Date Unknown).
Ahauser Tiefdruck–Gravuren GmbH & Co., *Engraving Tester ET 2000* (Pamphlet, Date Unknown).
Promatec Graphique, *M2R2 modele depose MICRO SURFACE Sarl* (Pamphlet, Antony, France, 1987).
*VIP—Video–Image–Processing* (Pamphlet, Author Unknown, Date Unknown).
Article on "Numerical Analysis: A Pratical Approach", Melvin J. Maron, p. 188 (no date).
Article on "The Image Processing Handbook", John C. Russ, pp. 105–113, (1992).
Article on "Numerical Recipes in C The Art of Scientific Computing", William H. Press, pp. 452–460 (1988).
"Datwyler", Max Daetwyler Corp., 12420 W. Reese Blvd., Huntersville, NC 28078 (Undated brochure).
"Twin–Pilot", Maschinenfabrik Kaspar Waltar GmbH & Co. KG, Phinganserstrasse 22,8000 Munchen 10, Germany (Undated).

*Primary Examiner*—Eric Frahm
*Attorney, Agent, or Firm*—Jacox, Meckstroth and Jenkins

[57] ABSTRACT

A computer controlled engraving system having a non-volatile memory loaded with error coefficients. The error coefficients represent previously experienced differences between computed cell configuration values and corresponding configuration values for cells actually engraved. Sets of error coefficients are tabulated and stored in the memory along with associated setup parameters. Setup of the engraving system for a new job is swiftly accomplished by using values of the setup parameters to retrieve sets of approximate error coefficients, from which interpolated values are obtained. The interpolated values of the error coefficients then are used for calculating configuration control parameters such as AC gain, video gain and white offset.

64 Claims, 5 Drawing Sheets

U.S. PATENT DOCUMENTS

| | | | |
|---|---|---|---|
| 3,876,829 | 4/1975 | Schreiber | 178/7.3 D |
| 3,904,816 | 9/1975 | Taudt et al. | 178/6 |
| 3,918,348 | 11/1975 | Runft | 90/11 R |
| 3,931,570 | 1/1976 | George et al. | 324/34 R |
| 3,956,583 | 5/1976 | Pugsley | 178/6.6 R |
| 4,001,495 | 1/1977 | Tauszig | 358/294 |
| 4,003,311 | 1/1977 | Bardin | 101/426 |
| 4,012,584 | 3/1977 | Gascoigne | 358/302 |
| 4,052,739 | 10/1977 | Wada et al. | 358/299 |
| 4,072,928 | 2/1978 | Wilder | 340/146.3 H |
| 4,075,662 | 2/1978 | Gall | 358/280 |
| 4,240,118 | 12/1980 | Wellendorf et al. | 358/269 |
| 4,315,285 | 2/1982 | Sommer et al. | 358/296 |
| 4,342,050 | 7/1982 | Traino | 358/256 |
| 4,363,037 | 12/1982 | Taudt | 358/296 |
| 4,394,693 | 7/1983 | Shirley | 358/298 |
| 4,437,122 | 3/1984 | Walsh et al. | 358/166 |
| 4,451,856 | 5/1984 | Buechler | 358/299 |
| 4,503,468 | 3/1985 | Serinken et al. | 358/256 |
| 4,612,584 | 9/1986 | George et al. | 358/299 |
| 4,683,499 | 7/1987 | Kuwabara | 358/264 |
| 4,683,500 | 7/1987 | Kitamura et al. | 358/280 |
| 4,691,229 | 9/1987 | Colditz et al. | 358/76 |
| 4,691,238 | 9/1987 | Yamada | 358/280 |
| 4,700,235 | 10/1987 | Gall | 358/283 |
| 4,944,593 | 7/1990 | Kalstroem et al. | 356/379 |
| 4,972,323 | 11/1990 | Cauwet | 364/474.29 |
| 5,029,011 | 7/1991 | Fraser | 358/299 |
| 5,229,861 | 7/1993 | Nozaka et al. | 358/299 |
| 5,293,426 | 3/1994 | Wouch et al. | 382/1 |
| 5,327,167 | 7/1994 | Pollard et al. | 358/299 X |
| 5,422,958 | 6/1995 | Wouch et al. | 382/141 |
| 5,481,379 | 1/1996 | Yosefi | 358/299 X |

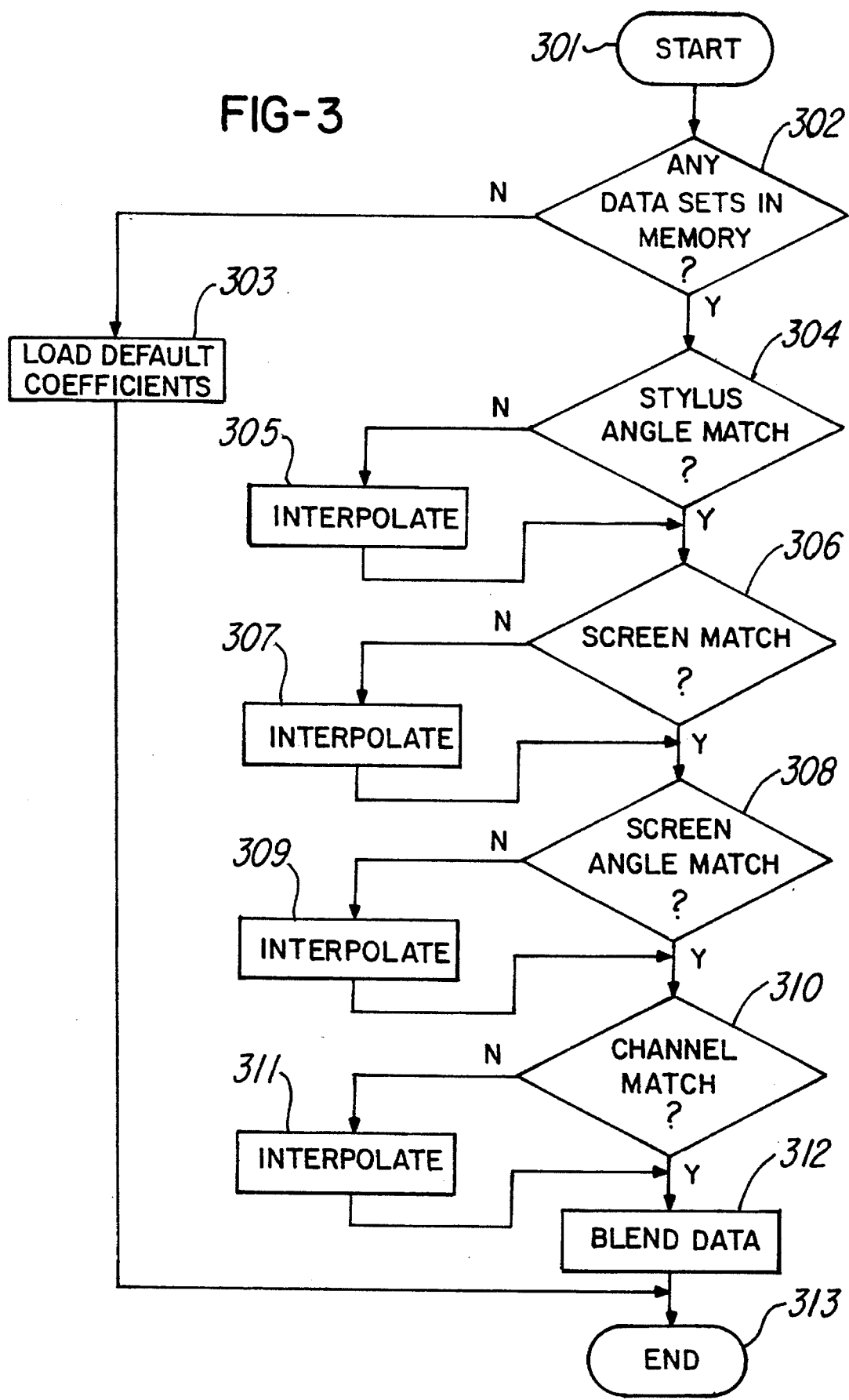

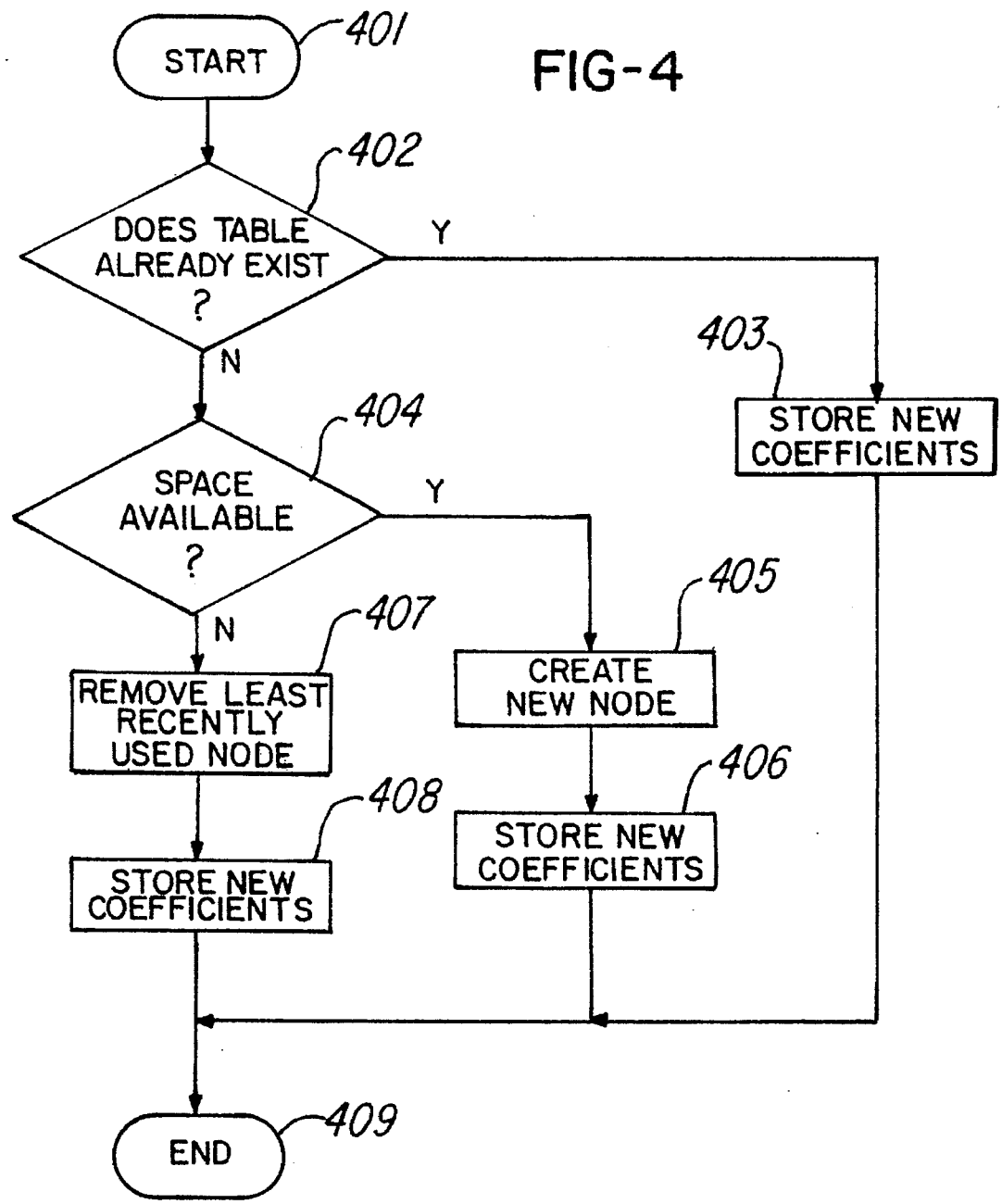

FIG-5

| NODE | SEARCH DATA | COEFFICIENT/CORRECTION TERMS | FEEDBACK/CORRECTION TERMS |
|---|---|---|---|
| 0 | -HEAD ID #<br>-STYLUS ANGLE<br>-SCREEN<br>-SCREEN ANGLE<br>-%CHANNEL | FULL CELL CORRECTION COEFFICIENT<br>CHANNEL CORRECTION COEFFICIENT<br>HIGHLIGHT CELL CORRECTION COEFFICIENT<br>CHANNEL WALL CORRECTION COEFFICIENT | SHOE POSITION<br>FOCUS POSITION<br>BURR CUTTER POSITION<br>WHITE CURRENT-OFFSET TERM |
| 1 | -HEAD ID #<br>-STYLUS ANGLE<br>-SCREEN<br>-SCREEN ANGLE<br>-%CHANNEL | FULL CELL CORRECTION COEFFICIENT<br>CHANNEL CORRECTION COEFFICIENT<br>HIGHLIGHT CELL CORRECTION COEFFICIENT<br>CHANNEL WALL CORRECTION COEFFICIENT | SHOE POSITION<br>FOCUS POSITION<br>BURR CUTTER POSITION<br>WHITE CURRENT-OFFSET TERM |
| o | | | |
| o | | | |
| o | | | |
| o | | | |
| n | -HEAD ID #<br>-STYLUS ANGLE<br>-SCREEN<br>-SCREEN ANGLE<br>-%CHANNEL | FULL CELL CORRECTION COEFFICIENT<br>CHANNEL CORRECTION COEFFICIENT<br>HIGHLIGHT CELL CORRECTION COEFFICIENT<br>CHANNEL WALL CORRECTION COEFFICIENT | SHOE POSITION<br>FOCUS POSITION<br>BURR CUTTER POSITION<br>WHITE CURRENT-OFFSET TERM |

51

ENGRAVING METHOD AND APPARATUS FOR GENERATING ENGRAVING DRIVE SIGNALS FOR ENGRAVING ENGRAVED AREAS OF ACCURATELY CONTROLLED SIZE IN THE SURFACE OF A WORKPIECE USING COEFFICIENT VALUES AND ASSOCIATED SET UP PARAMETER VALUES

CROSS REFERENCES TO RELATED APPLICATIONS

This application is a continuation-in-part of U.S. patent applications Ser. No. 08/022,127, filed Feb. 25, 1993, U.S. Pat. No. 5,424,845, Ser. No. 08/038,679, filed Mar. 26, 1993, U.S. Pat. No. 5,438,422, and Ser. No. 08/125,938, U.S. Pat. No. 5,440,398, filed Sep. 23, 1993 (which is a continuation-in-part of Ser. No. 08/038,679, U.S. Pat. No. 5,438,422).

BACKGROUND OF THE INVENTION

This invention relates to the field of engraving, and more particularly to engraving of gravure printing cylinders. Even more particularly, the invention relates to an engraving system comprising an engraving stylus and apparatus for causing the engraving stylus to engrave cells of accurately controlled size in the surface of a gravure printing cylinder.

An engraving stylus for such an engraving system is carried in a holder mounted on an engraving head supported against the surface of the workpiece by a shoe. The stylus holder is pivotally suspended within a magnetic field which oscillates under the influence of an AC head current modulated by a video signal. Variations in the head current drive the stylus into engraving against the surface of the cylinder. The depth of stylus penetration is controlled by variations in the video signal, as well as by settings of configuration parameters such as an AC gain, a video gain and a white offset. The white offset is the nominal spacing between the stylus tip and the surface of the workpiece when the head current goes to zero.

In order to engrave black cells, highlight cells and connecting channels of desired configuration, it has been necessary to undertake a tedious setup process prior to commencement of engraving. This process has involved trial and error engraving of test cells, inspection of the results and adjustment of the configuration control parameters. Frequently it has been necessary to repeat the process numerous times before satisfactory results have been achieved. It is a principal object of this invention to shorten that process.

SUMMARY OF THE INVENTION

It is, therefore, a primary object of the invention to provide a method and apparatus for correlating one or more setup parameters with associated coefficient values for repeated use during setup or realtime engraving.

In one aspect, this invention comprises a method for generating an engrave drive signal for use in an engraver, comprising the steps of: entering setup parameters for at least one cell into a computer; determining coefficient values associated with the setup parameters; and using the coefficient values and setup parameters to generate the engrave drive signal.

In another aspect, this invention comprises a method of engraving comprising the steps of: rotatably mounting a cylinder on an engraver; positioning an engraving head in operative relationship with the cylinder; entering at least one setup parameter for at least one cell into a computer coupled to the engraver; processing the at least one setup parameter to determine a coefficient value; and using the coefficient value and setup parameters to generate an engraving signal for energizing the engraving head.

In still another aspect, this invention comprises an engraver comprising: an engraving head; a computer coupled to the engraving head; and an input for inputting setup parameters into the computer; said computer being capable of generating a drive signal for energizing the engraving head to engrave a predetermined pattern on a workpiece located on the engraver in response to the setup parameters.

In still another aspect, this invention comprises a method of engraving comprising the steps of: rotatably mounting a cylinder on an engraver; positioning an engraving head in operative relationship with the cylinder; entering at least one setup parameter for at least one cell into a computer coupled to the engraver; processing the at least one setup parameter to determine a coefficient value; and using the coefficient value and setup parameters to generate an engraving signal for energizing the engraving head.

In another aspect, this invention comprises a method for generating an engraving drive signal for an engraver having a computer; comprising the steps of: entering at least one setup parameter into the computer; and processing the at least one setup parameter with the computer in order to generate the engraving drive signal.

An advantage of this invention is that it facilitates decreasing the time required to set an engraver up for engraving a pattern of cells.

Another advantage of this invention is that it facilitates recalling and using data associated with prior engraving operations and avoids the need to generate a new set of data for setting up an engraver to engrave an engraving job.

BRIEF DESCRIPTION OF THE DRAWING

FIG. 3 is a flow chart for an error coefficient retrieval procedure;

FIG. 4 is a flow chart for a procedure for storing error coefficients; and

FIG. 5 is illustrates a table format which may be utilized to arrange and correlate setup parameters and coefficient data.

DESCRIPTION OF THE PREFERRED EMBODIMENT

Figure 1:
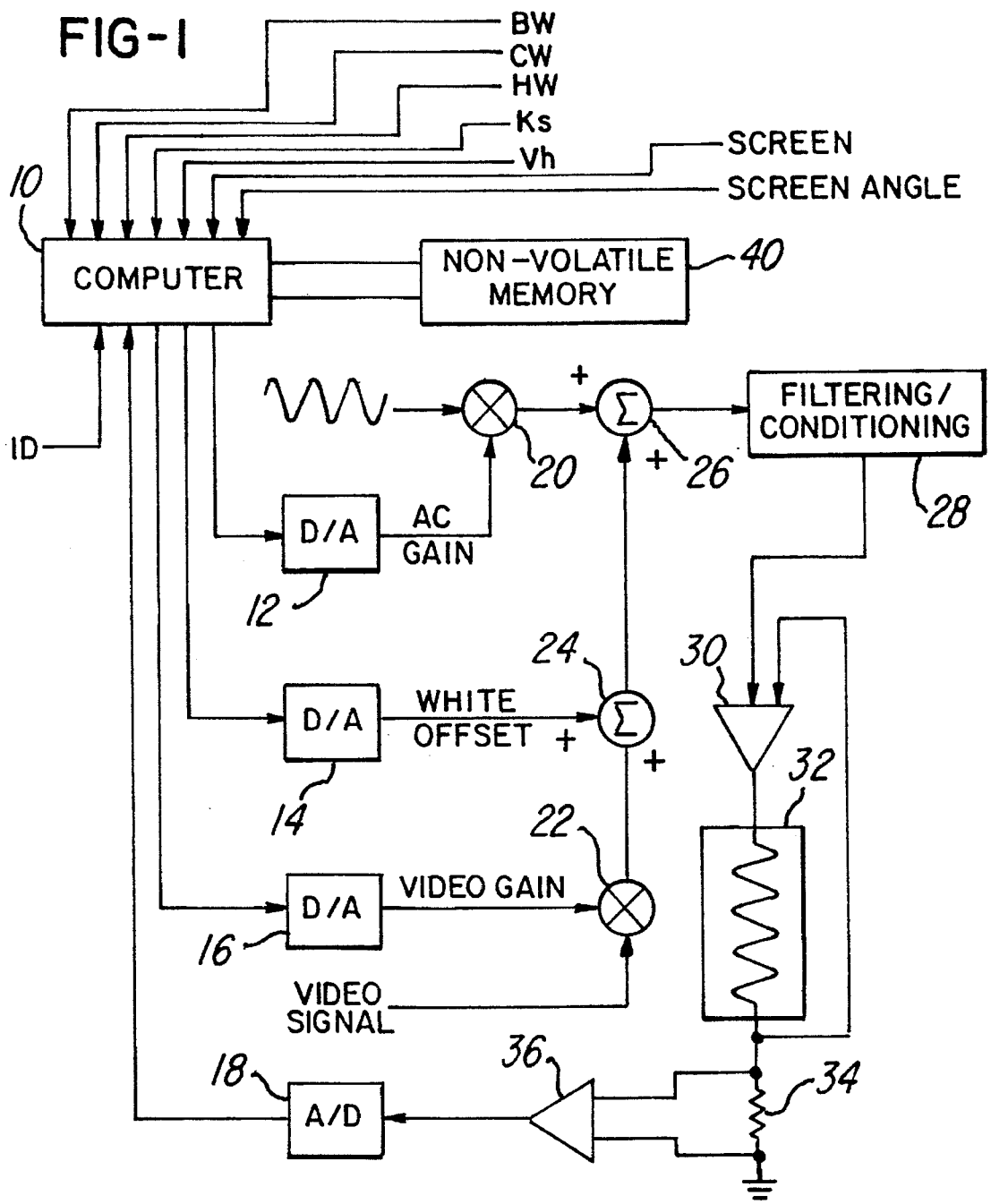
FIG. 1 is a schematic block diagram of a system for practicing the present invention.

A system for practicing the present invention may be configured as generally illustrated in FIG. 1. The system includes a computer 10 incorporating a microprocessor (not illustrated) connected for receiving a series of inputs from a set up control panel or other data input means (not illustrated). Typically the data input means will include means for signalling set up parameters such as Black Width (BW), Channel Width (CW), Highlight Width (HW), a stylus tip constant (Ks) and a voltage (Vh) to be used for engraving cells having a width HW. Alternatively, the data input means may supply other equivalent setup parameters, such as screen resolution, screen angle and % channel width in place of, or in addition to BW, CW, HW and Vh. An engraving head identification number may also be supplied.

The stylus constant, Ks is a constant which relates stylus depth to stylus cutting width for an angled tip stylus having linear cutting edges. For such a stylus the cutting depth (BD) for a black cell is given by the relation:

$$BD = Ks*BW$$

where:

$$Ks = 1/(2*TAN(t/2))$$

and t is the tip angle of the stylus.

Computer 10 uses the above parameters plus a black cell error coefficient (eb), a channel error coefficient (ec) a highlight cell error coefficient (eh) and a black level voltage (Vmax) to calculate a video gain (Kd) according to the following relation:

$$Kd = (Ks*(BW+eb) - Ks*(HW+eh))/(Vmax-Vh).$$

This is one of three configuration control signals. The calculation of this signal is the first step in setting up computer 10 for engraving. The computed value of Kd is transmitted to a digital-to-analog converter 16 which sets the gain of a multiplier 22.

After computing Kd, computer 10 calculates a second configuration control signal, a white offset (WD), according to the formula:

$$WD = Kd*Vmax - Ks*(BW+eb) + ew$$

where ew is a white offset balance error, computed as described in detail below. The computed value of WD is transmitted to a second digital-to-analog 14 converter connected to a summing junction 24. Summing junction 24 sums the white offset and amplified video signals received from a signal source (not illustrated) and amplified by multiplier 22. The output from summing junction 24 is applied to another summing junction 26 for summing with a sinusoidal signal generated by a multiplier 20.

Multiplier 20 receives an input sinusoidal signal from an oscillator (not illustrated) and amplifies that input by an AC gain factor (Ka) received from a third digital-to-analog converter. Ka is used as a third configuration control signal and is computed by computer 10 as the third step in the setup process. Ka is calculated by the formula:

$$Ka = (Ks*CW + WD - Kd*Vmax)/A$$

where A is the maximum value of the sinusoidal signal which is input to multiplier 20.

It will be appreciated that the setup parameters which are input to computer 10 are desired values and that the calculated configuration control parameters should produce engraved cells having the desired characteristics. In a perfect world the setup procedure would generate values for Ka, WD and Vd precisely producing the desired Black Width, Highlight Width and Channel Width, and the error coefficients eb, ew and eh would not be required. However, real world errors do exist, and therefore this invention establishes appropriate values for eb, eh and ew, and stores those values in a battery backed non-volatile memory 40. The memory 40 may be any one of numerous commercially available devices and may have a storage capacity of about 256K. The operation and organization of memory 40 are described in detail below.

The output from summing junction 26 is an engraving drive signal which is filtered by a filter circuit 28, amplified by amplifier 30 and applied to stylus driver 32. Stylus driver 32 is illustrated only in highly schematic form in FIG. 1. A more detailed description of such a stylus driver may be found in Buechler U.S. Pat. No. 4,450,486. Very briefly, a diamond engraving stylus is carried by a holder mounted on an arm projecting from a torsionally oscillated shaft. The driving signal from amplifier 30 is applied to a pair of opposed electromagnets to rotate the shaft through a maximum arc of approximately 0.25 deg. A guide shoe is positioned against the cylindrical workpiece in a precisely known position relative to the oscillating stylus. When the guide shoe is in contact with the workpiece, the stylus oscillates from a position just barely touching the workpiece to a retracted position about 100 microns distant from the surface of the workpiece. The workpiece rotates in synchronism with the oscillating movement of the stylus while a lead screw arrangement produces axial movement of the stylus and the shoe. Accordingly the stylus engraves cells of precisely controlled size on the surface of the workpiece.

As stated previously the output signals from computer 10 to D/A converters 12, 14 and 16 have a value for causing engraving head 32 to engrave cells of the desired size. For extremely high quality engraving it is necessary to adjust the output signals from computer 10 through use of the above mentioned error coefficients. This is accomplished by applying test signals to multiplier 22 so as to cause engraving head 32 to engrave test cells in the surface of the workpiece. These test cells are measured, either manually, with the aid of a microscope, or automatically, with the aid of a video scanner. In any event, the measured values of the test cells are relayed back to computer 10. In the case of manual adjustment the measured values may be input to the computer via the BW or HW input controls or other ones of the input controls on a programmed basis. In the case of automatic adjustment there is a feedback line from the video scanner (not illustrated) to computer 10.

Computer 10 generates the error coefficients ebe, ec and eh by comparing measured cell widths with the setup values for BW and HW. The resulting values are stored in non-volatile memory 40 for use in subsequent engraving jobs. The values may be arranged in a Table format as illustrated in FIG. 5. For a first time setup it may be advisable to cut additional test cells with recalculated values of Ka, WD and Kd using the calculated values of eb and eh. The cell widths may be measured again, so that computer 10 will be able to make adjustments to the error coefficients. The process may be repeated to achieve any desired degree of accuracy, but it is an object of this invention to speed up the set up process and thereby minimize lost time. Accordingly, error coefficients for a wide range of engraving jobs are cataloged and stored in memory 40 for subsequent use. Thereafter, if the system is required to perform an identical or similar setup, the required error coefficients may be read from memory 40. Once sufficient data has been accumulated, test cuts may not be required.

As noted above the engraving drive signal produces oscillation of the stylus. Peak engraving performance occurs when the amplitudes of the maximum positive and maximum negative currents are equal. This condition is referred to as "head balance". A head balance condition provides the maximum range of stylus oscillation, so that deep black cells may be engraved. The ew error coefficient is adjusted to produce head current balance. Adjustment of ew is accomplished with the aid of a head current sensing circuit including a sensing resistor 34, a differential amplifier 36 and an analog-to-digital converter 18.

The current sensing circuit senses the engraving current for a black signal and a white signal. These currents are relayed through A/D 18 to computer 10. If the currents are not within a predetermined or acceptable tolerance, then computer 10 balances or adjusts ew until the white current and the black current are opposite and equal. The adjustment may proceed by small increments of arbitrary size. Alternatively, computer may speed up the process by calculating the ratio of black/white depth difference divided by the black/white current difference and using that ratio to calculate the change in white offset required to achieve head current balance. If for some reason a specific unbalanced condition is required, ew may be adjusted or balanced to achieve that condition. If the currents are within an acceptable or predetermined tolerance band, then no adjustment or balancing of ew is needed.

Figure 2:
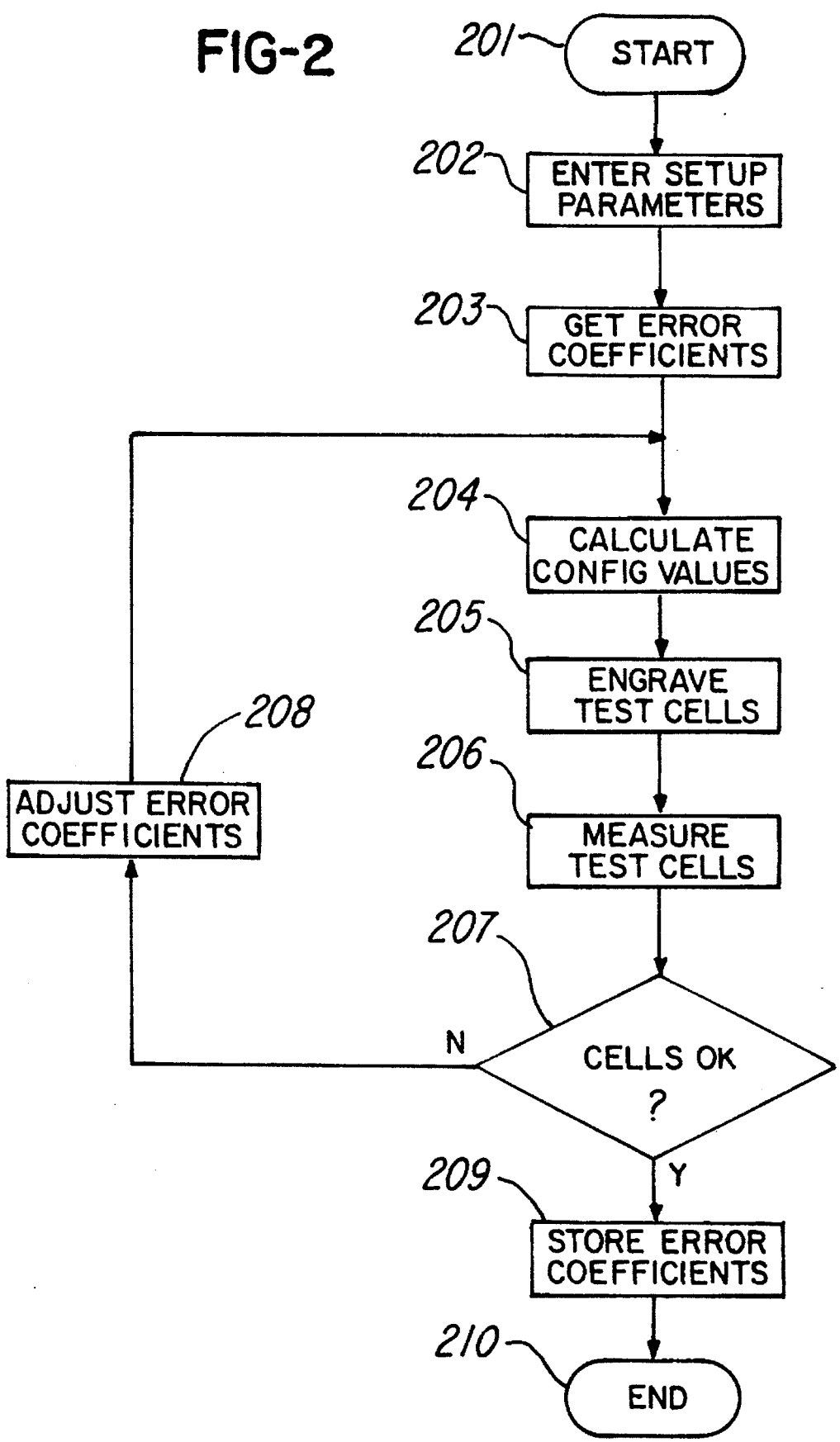
FIG. 2 is a flow chart illustrating the principal steps of the method practiced by the system of FIG. 1.

An overview of the above-described calibration process is presented in the flow chart of FIG. 2. The process involves a learning routine which begins at the symbol indicated by reference numeral 201. Following entry into the learning routine the process proceeds to block 202 where input parameter data is entered. The parameter data may be in the form of the parameters BW, HW, CW, Ks and Vh. Preferably, however, the parameter data is input in the alternative form of screen resolution, screen angle, stylus angle, and percent channel width, which thereafter are converted to cell dimension parameters by computer 10.

The next step involves retrieval of error coefficients from non-volatile memory 40, as indicated at block 203. Thereafter computer 10 computes configuration control values for transmission to D\A converters 12, 14 and 16. This computation utilizes the error coefficients which were retrieved from Table 51 from memory at block 203.

After appropriate configuration control signals have been sent to D\A converters 12, 14 and 16, the engraving system is ready to engrave test cells. These cells are engraved at block 205 and are measured at block 206. The measured data is input to computer 10.

At point 207 the computer compares the measured cell dimensions with the desired dimensions which had been used in the calculations of block 204. If the differences between the measured dimensions and the desired dimensions are not within predetermined limits, then the computer proceeds to block 208 where the calculated differences are used as incremental adjustments for the previous error coefficient values. The loop through blocks 204, 205, 206 and point 207 is then repeated.

When the engraver has produced test cells of the correct size, the adjusted error coefficients and the setup parameters are saved as a group at an assigned range of addresses within memory 40 (block 209 of FIG. 2). The learning procedure is then completed (point 210), and production engraving commences.

The organization of Table 51 in memory 40 is important in that it accommodates interpolation of error coefficient data from one job to the next. The memory is partitioned into nodes, each associated with a unique set of values for uniformly organized sets of setup parameters. The technique for memory partitioning will depend upon the particular programming language employed. In C language, for example, the memory may be organized through use of data structures having setup parameters and error coefficients as members of the structures. With such an arrangement is it possible to search across structures, interpolate between setup value parameters and obtain ratios for scaling error coefficient values. Retrieval of coefficient values is outlined in detail in the flow chart of FIG. 3.

Referring now to FIG. 3 error coefficient retrieval begins at point 301 and proceeds to point 302 where a check is made to determine whether any data sets are currently stored. The first time that a new system is used the answer will be NO, and computer 10 will proceed to block 303 where it will load a set of default coefficients into memory 40. Default data are gathered empirically from a sample of typical engraving heads. The next time through point 302 the answer will be YES.

Assuming that a YES answer is received at point 302, computer 10 will examine all data sets therein and will look for a structure having a stylus angle member identical in value to the stylus angle for the current job (point 304). If the identical stylus angle does not exist then error coefficient values will be read from job entries having the nearest larger and smaller stylus angles, and those stylus angles will be used for interpolation between error coefficient values (block 305). If a stylus angle match exists, then the error coefficients associated with that stylus angle are selected.

The program then proceeds similarly to look for matches of screen resolution (point 306), screen angle (point 308) and channel width (point 310) and to perform associated interpolations (blocks 307, 309 and 311 respectively), as required. This produces four sets of error coefficients which are blended into a single set by an averaging process (block 312). It will be appreciated that if matches are found at point 304, 306, 308 and 310, no interpolation is performed, and the blended data is identical to stored data for an exactly matching job. It will be appreciated that there is an engraving head identification number associated with each set of setup parameters. Customarily there will be no interpolation between different engraving heads. The computer exits from the routine at point 313.

FIG. 4 illustrates a routine for storing data in Table 51 in memory 40. The routine begins at point 401 and proceeds to point 402 where a check is made to determine whether there is an existing entry for the same set of setup parameters. If so, then the error coefficients associated with the existing entry are replaced by the new error coefficients (block 403).

If there is no existing node for the same set of setup parameters, then the program proceeds to point 404 where the memory is checked for availability of space for a new node. If space is available, then a new node is established in the memory (block 405), and the current error coefficients are saved in the new node (block 406).

If space is not available for a new node, then the program proceeds to block 407, removes the least recently used node and replaces it with a new node. Then the program proceeds to block 408 for storage of a new data structure in the memory space seized from the old node. Data storage terminates at point 409.

If desired, the Table 51 and associated data structures, or nodes may be expanded to accommodate storage of additional information, such as, for instance, a shoe position, a burr cutter position, or a focus distance for an optical scanner, camera or and the like.

While the methods herein described, and the forms of apparatus for carrying these methods into effect, constitute preferred embodiments of this invention, it is to be understood that this invention ie not limited to these precise methods and forms of apparatus, and that changes may be made in either without departing from the scope of the invention, which is defined in the appended claims.

What is claimed is:

1. A method for generating an engrave drive signal for use in an engraver, comprising the steps of:

entering setup parameters for at least one cell into a computer;

determining a coefficient value associated with said setup parameters; and using said coefficient value and setup parameters to generate said engrave drive signal.

2. The method as recited in claim 1 wherein said method further comprises the step of:

accumulating a plurality of coefficient values for a plurality of setup parameters;

compiling a table of said plurality of coefficient values.

3. The method as recited in claim 2 wherein said method further comprises the steps of:

entering second setup parameters;

accessing said table in response to said second setup parameters to generate a second coefficient value;

generating a second engrave drive signal in response to said second setup parameters and said second coefficient value.

4. The method as recited in claim 3 wherein said coefficient value and second coefficient value are different.

5. The method as recited in claim 3 wherein said coefficient value and said second coefficient value are substantially the same.

6. The method as recited in claim 2 wherein said method further comprises the step of:

storing said plurality of coefficient values in a non-volatile memory.

7. The method as recited in claim 1 wherein said method further comprises the step of:

performing a test cut of a plurality of cells, examining said test cut;

using said test cut to determine said coefficient values;

creating a table of said coefficient values.

8. The method as recited in claim 7 wherein said method further comprises the step of:

inputting a second set of setup parameters;

accessing said table to determine a second coefficient value for said second setup parameters.

9. The method as recited in claim 1 wherein said entering step comprises the step of:

selecting said setup parameters to include at least one of the following: a black width, channel width, highlight width, stylus tip constant, a voltage, black depth, screen resolution, screen angle, stylus angle, shoe position, video focus position, or percent channel width.

10. The method as recited in claim 1 wherein said method further comprises the step of:

repeating said method for a plurality of setup parameters;

creating a table correlating one of said plurality of setup parameters with at least one coefficient value.

11. The method as recited in claim 10 wherein said method comprises the step of:

inputting at least one of said plurality of setup parameters;

accessing said table to determine a correlating coefficient value.

12. The method as recited in claim 11 wherein said method further comprises the step of:

generating an interpolated coefficient value if said at least one setup parameter is not in said table.

13. The method as recited in claim 12 wherein said method further comprises the step of:

updating said table to include said interpolated coefficient value.

14. The method as recited in claim 1 wherein said method further comprises:

including a shoe position and/or a video focus distance as one of said setup parameters.

15. The method as recited in claim 14 wherein said method further comprises:

repeating said method for a plurality of setup parameters;

creating a table correlating one of said plurality of setup parameters with at least one coefficient value.

16. The method as recited in claim 1 wherein said method comprises the step of:

generating said drive signal using the formula:

$$Kd=(Ks*(BW+eb)-Ks*(HW+eh))/(Vmax-Vh)$$

where Kd is a video gain; eb is a coefficient, eh is another coefficient; Vmax is a voltage; BW is a width; HW is a second width; Ks is a constant; Vh is a second voltage.

17. The method as recited in claim 16 wherein said method comprises the step of:

generating said drive signal using the formula:

$$WD=Kd*Vmax-Ks*(BW+eb)+ew$$

where WD is an offset.

18. The method as recited in claim 1 wherein said method further comprises the step of:

using a table to determine said coefficient value in response to said setup parameters.

19. The method as recited in claim 18 wherein said method further comprises the step of:

updating said table for any setup parameters that do not appear therein.

20. The method as recited in claim 1 wherein said method further comprises the step of:

determining said coefficient value for a first setup parameter;

determining a second coefficient value for a second setup parameter;

blending said coefficient value and said second coefficient value to provide a blended coefficient.

21. The method as recited in claim 20 wherein said blended coefficient is an average, said using step comprising the step of:

using said blended coefficient and said setup parameters to generate said engrave drive signal.

22. The method as recited in claim 1 wherein said method further comprising:

analyze said engrave drive signal to determined if it is within predetermined signal tolerance.

23. The method as recited in claim 22 further comprising the step of:

balancing said engrave drive signal if it is not within said predetermined signal tolerance to provide a balanced engrave drive signal.

24. The method as recited in claim 23 further comprising the step of:

using said balanced engrave drive signal to generate a drive command signal.

25. The method as recited in claim 24 further comprising the step of:

using said drive command signal to energize a driver for either a shoe or a camera.

26. The method as recited in claim 24 wherein said said method comprises the step of:

generating a table for correlation said setup parameters with said coefficient values.

27. The method as recited in claim 26 wherein said method further comprises the step of:

updating said table using said drive command signal and said balanced engrave drive signal.

28. A method of engraving comprising the steps of:

rotatably mounting a cylinder on an engraver;

positioning an engraving head in operative relationship with said cylinder;

entering at least one setup parameter for at least one cell into a computer coupled to the engraver;

processing said at least one setup parameter to determine a coefficient value; and using said coefficient value and setup parameters to generate an engraving signal for energizing said engraving head.

29. The method as recited in claim 28 wherein said method further comprises the step of:

accumulating a plurality of coefficient values for a plurality of said at least one setup parameter;

compiling a table of said plurality of coefficient values.

30. The method as recited in claim 29 wherein said method further comprises the steps of:

entering at least one second setup parameter;

accessing said table in response to said at least one second setup parameter to generate a second coefficient value;

generating a second engrave drive signal in response to said at least one second setup parameter and said second coefficient value.

31. The method as recited in claim 30 wherein said coefficient value and second coefficient value are different.

32. The method as recited in claim 30 wherein said coefficient value and said second coefficient value are substantially the same.

33. The method as recited in claim 29 wherein said method further comprises the step of:

storing said plurality of coefficient values in a non-volatile memory.

34. The method as recited in claim 28 wherein said method further comprises the step of:

performing a test cut of a plurality of cells, examining said test cut;

using said test cut to determine said coefficient values;

creating a table of said coefficient values.

35. The method as recited in claim 34 wherein said method further comprises the step of:

inputting a second set of setup parameters;

accessing said table to determine a second coefficient value for said second setup parameters.

36. The method as recited in claim 28 wherein said entering step comprises the step of:

selecting said setup parameters to include at least one of the following a black width, channel width, highlight width, stylus tip constant, a voltage, black depth, screen resolution, screen angle, stylus angle, shoe position, video focus position, or percent channel width.

37. The method as recited in claim 28 wherein said method further comprises the step of:

repeating said method for a plurality of setup parameters;

creating a table correlating one of said plurality of setup parameters with at least one coefficient value.

38. The method as recited in claim 37 wherein said method comprises the step of:

inputting at least one of said plurality of setup parameters;

accessing said table to determine a correlating coefficient value.

39. The method as recited in claim 38 wherein said method further comprises the step of:

generating an interpolated coefficient value if said at least one setup parameter is not in said table.

40. The method as recited in claim 39 wherein said method further comprises the step of:

updating said table to include said interpolated coefficient value.

41. The method as recited in claim 28 wherein said method further comprises:

including a shoe position and/or a video focus distance as one of said setup parameters.

42. The method as recited in claim 41 wherein said method further comprises:

repeating said method for a plurality of setup parameters;

creating a table correlating one of said plurality of setup parameters with at least one coefficient value.

43. The method as recited in claim 28 wherein said method comprises the step of:

generating said drive signal using the formula:

$$Kd=(Ks*(BW+eb)-Ks*(HW+eh))/(Vmax-Vh)$$

where Kd is a video gain; eb is a coefficient, eh is another coefficient; Vmax is a voltage; BW is a width; HW is a second width; Ks is a constant; Vh is a second voltage.

44. The method as recited in claim 43 wherein said method comprises the step of:

generating said drive signal using the formula:

$$WD=Kd*Vmax-Ks*(BW+eb)+ew$$

where WD is an offset.

45. The method as recited in claim 28 wherein said method further comprises the step of:

using a table to determine said coefficient value in response to said at least one setup parameter.

46. The method as recited in claim 45 wherein said method further comprises the step of:

updating said table for any at least one setup parameter that does not appear therein.

47. The method as recited in claim 28 wherein said method further comprises the step of:

determining said coefficient value for a first setup parameter;

determining a second coefficient value for a second setup parameter;

blending said coefficient value and said second coefficient value to provide a blended coefficient.

48. The method as recited in claim 47 wherein said blended coefficient is an average, said using step comprising the step of:

using said blended coefficient and said setup parameters to generate said engrave drive signal.

49. The method as recited in claim 28 further comprising the step of:

balancing said engraving drive signal if it is not within said predetermined signal tolerance to provide a balanced engrave drive signal.

50. The method as recited in claim 49 further comprising the step of:

using said balanced engrave drive signal to generate a drive command signal.

51. The method as recited in claim 50 further comprising the step of:

using said drive command signal to energize a driver for a shoe, a camera or a burr cutter.

52. The method as recited in claim 51 wherein said method comprises the step of:

generating a table for correlation said setup parameters with said coefficient values.

53. The method as recited in claim 34 wherein said method further comprises the step of:

updating said table using said drive command signal and said balanced engrave drive signal.

54. A method for generating an engraving drive signal for an engraver having a computer; comprising the steps of:

entering at least one setup parameter into said computer; and processing said at least one setup parameter with said computer in order to generate said engraving drive signal wherein said processing step comprises the step of:

generating a coefficient value corresponding to said at least one setup parameter.

55. A method for generating an engraving drive signal for an engraver having a computer; comprising the steps of:

entering at least one setup parameter into said computer; and processing said at least one setup parameter with said computer in order to generate said engraving drive signal wherein said processing step comprises the step of:

accessing a correlation table which correlates said at least one parameter to a coefficient value.

56. A method for generating an engraving drive signal for an engraver having a computer; comprising the steps of:

entering at least one setup parameter into said computer; and processing said at least one setup parameter with said computer in order to generate said engraving drive signal wherein said method further comprises the step of:

updating said correlation table for any at least one setup parameter that does not appear therein.

57. A method for generating an engraving drive signal for an engraver having a computer; comprising the steps of:

entering at least one setup parameter into said computer; and processing said at least one setup parameter with said computer in order to generate said engraving drive signal wherein said method comprises the step of:

creating a correlation table correlating a plurality of said at least one setup parameters to a plurality of coefficient values.

58. A method for generating an engraving drive signal for an engraver having a computer; comprising the steps of:

entering at least one setup parameter into said computer; and processing said at least one setup parameter with said computer in order to generate said engraving drive signal wherein said correlation table comprises at least one of the following setup parameters: a black width, channel width, highlight width, stylus tip constant, a voltage, black depth, screen resolution, screen angle, stylus angle, shoe position, video focus position, or percent channel width.

59. An engraver comprising:

an engraving head;

a computer coupled to said engraving head; and an input for inputting setup parameters into said computer;

said computer for generating a drive signal for energizing said engraving head in response to said setup parameters and at least one associated coefficient value to engrave a predetermined pattern on a workpiece located on said engraver in response to said setup parameters.

60. The engraver as recited in claim 59 wherein said computer comprises a table correlating a plurality of setup parameters a plurality of coefficient values.

61. The engraver as recited in claim 60 wherein each of said plurality of coefficient values generally correspond to at least one error value.

62. The engraver as recited in claim 60 wherein said computer comprises an updater for updating said table with at least one coefficient value for any plurality of setup parameters that was not located therein.

63. The engraver as recited in claim 62 wherein said computer further comprises an interpolator for interpolating at least one coefficient value in response to said plurality of setup parameters.

64. An engraving system comprising:

(a) an engraving head responsive to engraving drive signals for engraving a workpiece;

(b) drive means responsive to a carrier input signal and a video input signal for generating said engraving drive signals, said drive means being configurable by configuration control signals;

(c) digital computing means responsive to setup parameters and error coefficients for generating said configuration control signals; and (d) a non-volatile digital memory loaded with a plurality of sets of said error coefficients, each associated with a different set of values for said setup parameters, said digital memory being connected for relaying a selected one of said sets of error coefficients to said digital computing means upon demand.

* * * * *

UNITED STATES PATENT AND TRADEMARK OFFICE
CERTIFICATE OF CORRECTION

PATENT NO. : 5,617,217
DATED : April 1, 1997
INVENTOR(S) : Brewer et al.

It is certified that error appears in the above-identified patent and that said Letters Patent is hereby corrected as shown below:

Column 2, line 47, after "FIG. 5" please delete "is".

Column 4, line 41, please delete "ebe" and insert --eb-- therefor.

Column 5, line 11, after "computer" please insert --10--.

Column 6, line 60, please delete "or and", and insert --and/or-- therefor.

In Claim 4, column 7, line 24, after "value and" please insert --said--.

In claim 22, column 8, line 57, please delete "determined" and insert --determine-- therefor.

In claim 22, column 8, line 58, after "is within", please insert --said--.

In claim 26, column 9, line 5, after "wherein said", please delete "said"

Claim 26, column 9, line 7, after "correlation", please insert --of--.

UNITED STATES PATENT AND TRADEMARK OFFICE
CERTIFICATE OF CORRECTION

PATENT NO. : 5,617,217
DATED : April 1, 1997
INVENTOR(S) : Brewer et al.

It is certified that error appears in the above-identified patent and that said Letters Patent is hereby corrected as shown below:

Claim 31, column 9, line 41, after "value and", please insert --said--.

Claim 60, column 12, line 32, after "parameters", please insert --to--.

Signed and Sealed this

Thirtieth Day of December, 1997

Attest:

Attesting Officer

BRUCE LEHMAN
Commissioner of Patents and Trademarks